United States Patent
Garcia

(10) Patent No.: US 11,958,323 B2
(45) Date of Patent: Apr. 16, 2024

(54) LOCK DEVICE FOR SELF LATCHING-COUPLER

(71) Applicant: Marco Garcia, Chandler, AZ (US)

(72) Inventor: Marco Garcia, Chandler, AZ (US)

(73) Assignee: U-HAUL INTERNATIONAL, INC., Phoenix, AZ (US)

( * ) Notice: Subject to any disclaimer, the term of this patent is extended or adjusted under 35 U.S.C. 154(b) by 836 days.

(21) Appl. No.: 16/984,374

(22) Filed: Aug. 4, 2020

(65) Prior Publication Data
US 2022/0041025 A1    Feb. 10, 2022

(51) Int. Cl.
*B60D 1/28*    (2006.01)
*B60D 1/06*    (2006.01)
*B60D 1/36*    (2006.01)
*E05B 67/38*   (2006.01)

(52) U.S. Cl.
CPC .............. *B60D 1/363* (2013.01); *B60D 1/065* (2013.01); *B60D 1/28* (2013.01); *E05B 67/383* (2013.01)

(58) Field of Classification Search
CPC ........................................................ B60D 1/60
See application file for complete search history.

(56) References Cited

U.S. PATENT DOCUMENTS

| | | |
|---|---|---|
| 3,391,555 A | 7/1968 | Mamo |
| 3,605,457 A | 9/1971 | Foster |
| 4,141,569 A | 2/1979 | Dilk |
| 4,730,841 A | 3/1988 | Ponder |
| 5,322,316 A | 6/1994 | Wheeler |
| 5,584,495 A | 12/1996 | Mason |
| 5,681,053 A | 10/1997 | Misukanis et al. |
| 5,947,506 A | 9/1999 | Bauer |
| 6,070,441 A | 6/2000 | Bernstrom |
| 6,202,453 B1 * | 3/2001 | Disher ................... E05B 73/00 280/507 |
| 6,244,614 B1 * | 6/2001 | Bonvillain .............. B60D 1/60 280/507 |
| 7,246,810 B2 * | 7/2007 | Bussiere ................. B60D 1/60 280/507 |
| 7,699,336 B2 * | 4/2010 | Van Laere .............. B60D 1/60 280/507 |
| 9,358,850 B1 * | 6/2016 | Bale ....................... B60D 1/06 |
| 10,144,256 B1 | 12/2018 | Garcia |

FOREIGN PATENT DOCUMENTS

| | | | |
|---|---|---|---|
| EP | 0105621 A2 * | 4/1983 | |
| WO | WO-9515864 A1 * | 6/1995 | .............. B60D 1/60 |

* cited by examiner

*Primary Examiner* — Kevin Hurley
*Assistant Examiner* — Hosam Shabara
(74) *Attorney, Agent, or Firm* — Richard E. Oney; Venjuris, P.C.

(57) ABSTRACT

A coupler lock device is configured for use with a self-latching trailer coupler securing a hitch ball in the coupler socket. The coupler lock device has a housing that includes a top panel portion defining a cavity configured so that, when the housing is secured in position over the trailer coupler, the housing top panel prevents seating of the hitch ball in the coupler socket by restricting upward movement of the release lever when an attempt is made to insert the hitch ball into the coupler socket. Also, when the housing is secured in position over the trailer coupler with a hitch ball seated in the coupler socket, the housing top panel prevents removal of the coupler socket from the hitch ball by restricting upward movement of the release lever that would otherwise release the coupler socket from the hitch ball.

12 Claims, 11 Drawing Sheets

LOCK DEVICE FOR SELF LATCHING-COUPLER

BACKGROUND

This invention relates generally to coupler lock devices for use with a trailer couplers. In particular, the invention relates to a locking device for use with a self-latching ball-and-socket trailer coupler.

One well known type of coupler mechanism, the trailer hitch, is commonly used to secure a trailer to a vehicle for transport. Typically, such couplers include a standard ball and socket arrangement which incorporates a retaining mechanism for securing the hitch ball in a retention or coupled position within the coupler socket. The retaining mechanism, which commonly includes a user-operated release lever, when properly set in a closed position provides a retaining force between the ball and socket, thereby securing the trailer to the towing vehicle. One such ball-and-socket coupler is a self-latching coupler, which automatically latches when the trailer coupler is lowered onto the hitch ball. One example of such a self-latching coupler is the EZ Latch coupler marketed by Demco Manufacturing Co. of Boyden, Iowa.

Since many trailers are used to haul valuable items, such as boats, cars, household belongings, etc., they are highly visible and attractive targets for criminal activity. Although prior art lock devices have been used to deter unauthorized uncoupling and theft of trailers that utilize a self-latching coupler such as the Demco EZ Latch coupler, these lock devices suffer from disadvantages. Typically, these devices utilize a locking pin or shaft that is inserted through holes in the sides of the coupler to restrict movement of the retaining mechanism. Such lock devices, however, are relatively easy for a thief to defeat.

There is a need, therefore, for an improved coupler lock device for self-latching trailer couplers. It is an object of the present invention to provide such an apparatus.

Additional objects and advantages of the invention will be set forth in the description that follows, and in part will be apparent from the description, or may be learned by practice of the invention. The objects and advantages of the invention may be realized and obtained by means of the instrumentalities and combinations pointed out in the appended claims.

SUMMARY OF THE INVENTION

To achieve the foregoing objects, and in accordance with the purposes of the invention as embodied and broadly described in this document, there is provided a coupler lock device for use with a self-latching trailer coupler, wherein the trailer coupler includes (i) a coupler socket adapted to receive a hitch ball, and (ii) a ball clamp assembly. The coupler socket includes a bottom socket opening that allows the insertion of the hitch ball into the coupler socket. The ball clamp assembly includes a ball clamp disposed on a lower portion of a release lever shaft and a release lever coupled to an opposing upper portion of the release lever shaft. The release lever is movable between a closed position and an open position. The ball clamp assembly is configured so that: (i) when the release lever is in the closed position and as the hitch ball is inserted into the coupler, the ball clamp assembly moves upward to an intermediate position, and as the hitch ball becomes seated in the coupler socket the ball clamp assembly automatically moves downward to a latched position wherein the ball clamp retains the hitch ball within the coupler socket; and (ii) when the release lever is in the open position with the hitch ball seated in the coupler socket, the hitch ball can be removed from the coupler socket.

A coupler lock device according to the present invention includes (i) a housing that has an opening configured to allow the housing to be secured on the self-latching trailer coupler, (ii) a housing top panel portion configured so that, when the housing is positioned over the trailer coupler with the coupler release in the closed position, the housing top panel portion prevents seating of a hitch ball in the coupler socket by restricting upward movement of the ball clamp assembly to the intermediate upper position when the hitch ball is inserted into the coupler, and (iii) a housing closure member. The housing closure member is movable between (i) an open position wherein the housing can be positioned over and removed from the trailer coupler and (ii) a closed position wherein, when the housing is positioned over the trailer coupler, it can be secured to the trailer coupler to restrict removal of the housing from the trailer coupler.

In some embodiments, the closure member can comprise a panel (e.g., a bottom panel) hingedly coupled to the housing. The housing can include a closure tab, and the closure member can include a slot configured to receive the closure tab when the closure member is in the closed position. The closure tab can include a hole configured to receive a padlock shackle.

BRIEF DESCRIPTION OF THE DRAWINGS

The accompanying drawings, which are incorporated in and constitute a part of the specification, illustrate the presently preferred embodiments of the invention and, together with the general description given above and the detailed description of the preferred methods and embodiments given below, serve to explain the principles of the invention.

DESCRIPTION

Figure 1A:
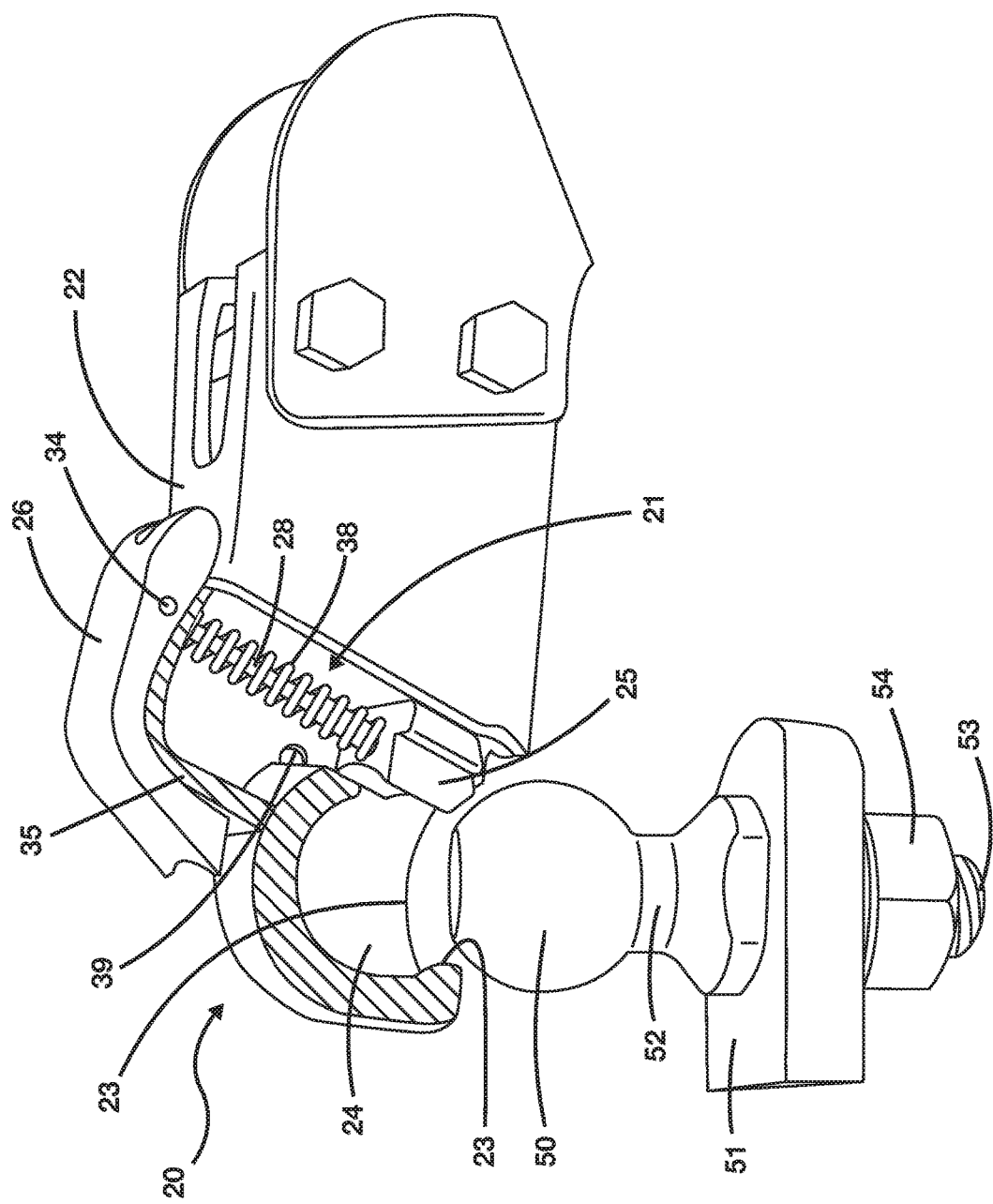
FIG. 1a is a right side perspective, partial sectional view of a prior self-latching ball clamp trailer coupler, showing the coupler socket positioned over a hitch ball with the coupler release lever in the closed position.

Reference will now be made in more detail to presently preferred embodiments of the invention, as illustrated in the accompanying drawings. While the invention is described more fully with reference to these examples and drawings, the invention in its broader aspects is not limited to the specific details, representative devices, and illustrative examples shown and described. Rather, the description which follows is to be understood as a broad, teaching disclosure directed to persons of ordinary skill in the appropriate arts, and not as limiting upon the invention.

It will be appreciated that terms such as "front," "forward," "rear," "rearward," "upper," "inner," "outer," "vertical," "horizontal," "bottom," "below," "top," "side," "inwardly," "outwardly," "downwardly" and "lower" and other positionally descriptive terms used in this specification are used merely for ease of description and refer to the orientation of the referenced components as shown in the figures. It should be understood that any orientation of the components described herein is within the scope of the present invention.

For purposes of explanation, and to further assist in the understanding of this invention, a brief description of the operation of a standard previously-known self-latching ball and socket coupler with a release lever follows. Referring to FIGS. 1a-1d, the coupler 20 is affixed, by commonly known techniques, e.g. welding, bolting, etc., to the frame of the vehicle that is to be towed, e.g. a trailer (not shown), thus forming an integrated frame unit. The coupler 20 has a coupler body 22 with a ball-shaped coupler socket 24 that has a bottom coupler socket opening 23, which allows the insertion of a hitch ball 50 into the coupler socket 24 to hitch the trailer to a tow vehicle (not shown) such as a truck or sport utility vehicle. The hitch ball 50 is commonly affixed to the rear end of the tow vehicle utilizing a standard mounting that can support the tongue weight of the trailered vehicle and that includes a hitch ball support 51. In the embodiment shown in FIGS. 1a-1d, the hitch ball 50 is formed at one end of a ball stem 52, which has a threaded portion 53 at the other end for receiving a ball nut 54 to affix the hitch ball 50 to the hitch ball support 51. In operation the trailer coupler socket 24 is lowered from an elevated height onto the hitch ball 50 such that the hitch ball 50 advances into the coupler socket 24 through the coupler socket opening 23 (as described below) until it seats within the coupler socket 24.

Referring to FIGS. 1a-1d and 5, the self-latching ball and socket coupler 20 further includes a ball clamp assembly 21 that includes a ball clamp 25, a release lever 26, and release lever shaft 28 that is disposed rearward of the coupler socket 24 in a generally vertical position. The ball clamp 25 is coupled to a lower portion 30 of the release lever shaft 28. An upper portion 32 of the release lever shaft 28 extends through a hole 36 in a top portion 35 of the coupler body 22 rearward of the coupler socket 24. The release lever 26 is rotatably coupled to the release lever shaft upper portion 32 via a mounting pin 34 that extends through a cross-hole in the shaft upper portion 32 and also laterally through one side of the release lever 26. In this configuration, the release lever 26 can be rotated between a closed position (shown in FIG. 1a) and an open position (shown in FIG. 1d) by manually lifting the side of the release lever 26 opposite the mounting pin 34. A cylindrical compression spring 38 is disposed on the release lever shaft 28 between the ball clamp 25 and the coupler body top portion 35 rearward of the coupler socket 24. In this configuration, rotating the release lever 26 to the open position (see FIG. 1d) lifts the ball clamp 25 upward and away from the coupler socket 24 thereby increasing the effective size of the coupler socket opening 23.

Figure 1B:
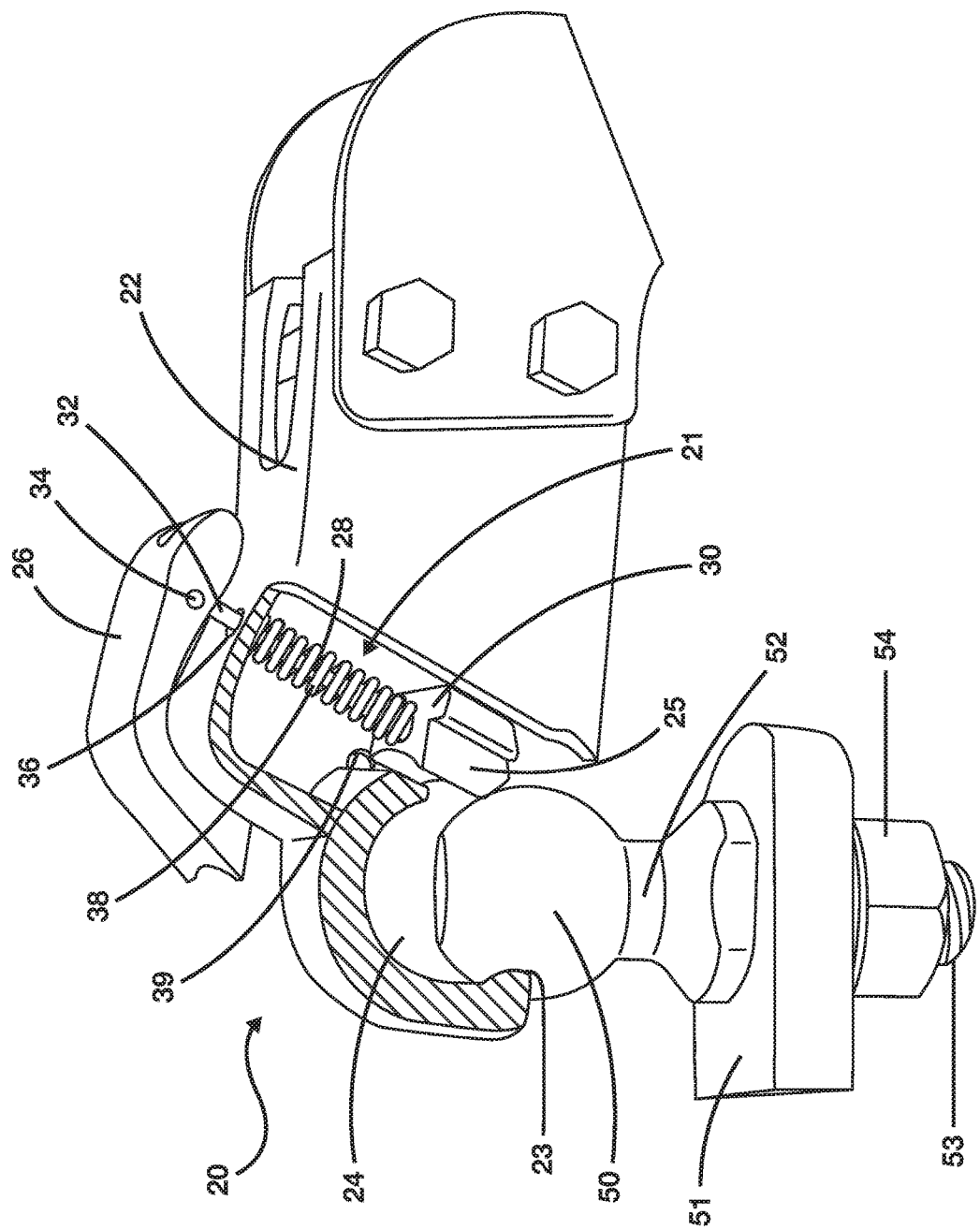
FIG. 1b is a partial sectional view of the trailer coupler of FIG. 1a showing the hitch ball partially inserted into the coupler socket in contact with ball clamp and displacing the ball clamp assembly upward to an intermediate position.
Figure 1C:
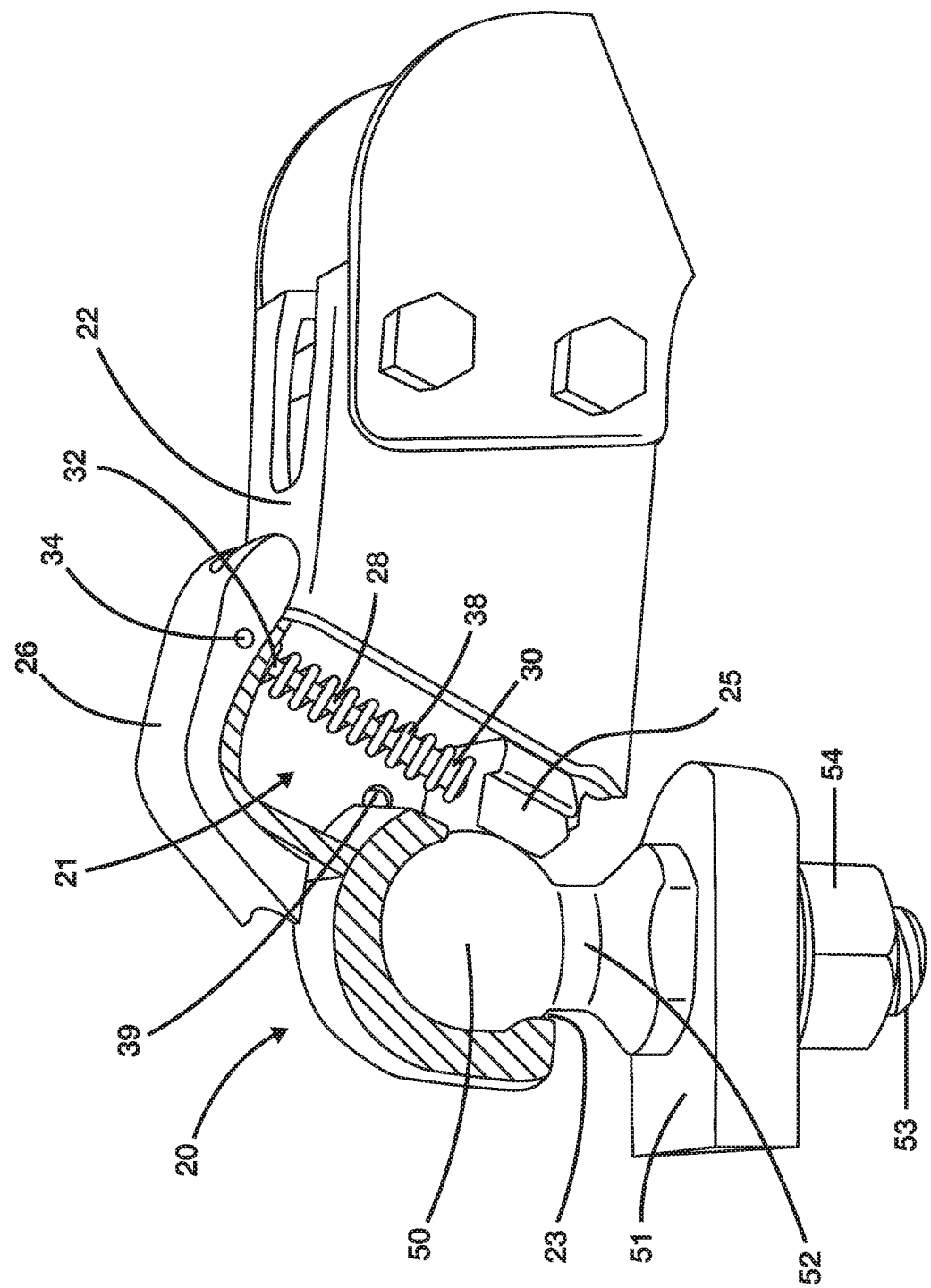
FIG. 1c is a partial sectional view of the trailer coupler of FIG. 1a, showing the hitch ball fully seated within the coupler socket with the ball clamp assembly having returned to the closed retention position.

Again referring to FIGS. 1a-1d, the self-latching operation of the coupler 20 will now be described. As can be seen in FIG. 1a, to couple the trailer to the tow vehicle for towing, the trailer/coupler assembly is first aligned over the hitch ball 50 with release lever 26 in the closed position. The trailer (and the attached coupler 20) is then lowered so that the coupler socket 24 contacts the ball clamp 25, as shown in FIG. 1b. As the coupler 20 is lowered and the hitch ball 50 is inserted into the coupler, the hitch ball 50 causes the ball clamp assembly 21 (including the ball clamp 25, the release lever shaft 28, and the release lever 26) to slide upward and rearward to an intermediate position shown in FIG. 1b. This increases the size of the coupler socket opening 23 to allow for insertion of the hitch ball 50 and also compresses the spring 38. As the coupler 20 continues to be lowered and the hitch ball 50 inserts further into the coupler socket 24, the compressed spring 38 exerts a downward force on the ball clamp 25. When the hitch ball 50 becomes firmly seated within the coupler socket 24 the force of the compressed spring 38 causes the ball clamp assembly 21 to automatically snap back downward into the closed position shown in FIG. 1c. In this position, the ball clamp 25 reduces the size of the coupler socket opening 23 so that the hitch ball 50 can no longer be readily retracted from the coupler socket 24, thereby securely retaining the hitch ball 50 within the coupler socket 24.

Figure 1D:
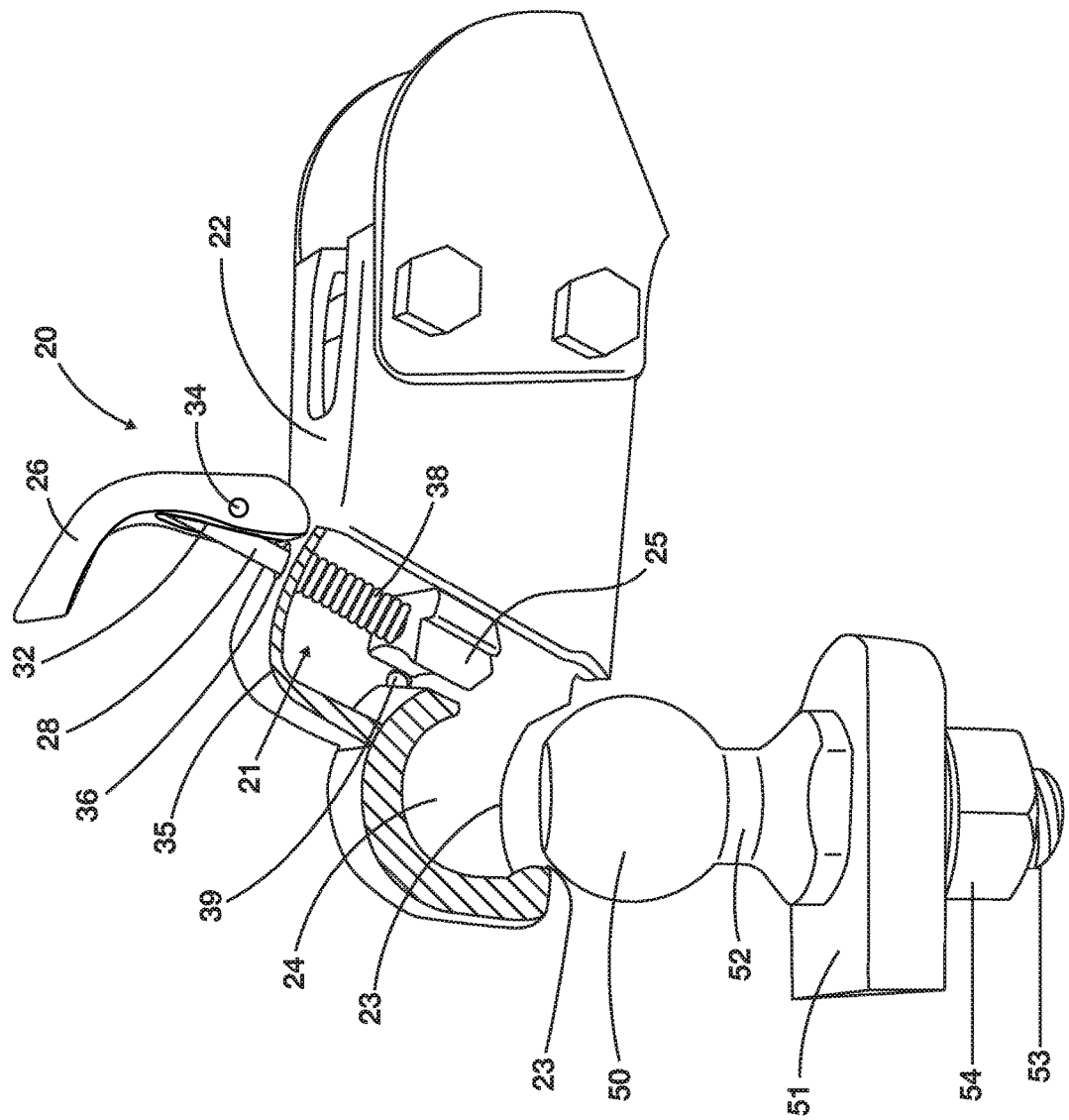
FIG. 1d is a partial sectional view of the trailer coupler of FIG. 1a with the release lever rotated to the open position, thereby allowing the coupler to be removed from the hitch ball.
Figure 2:
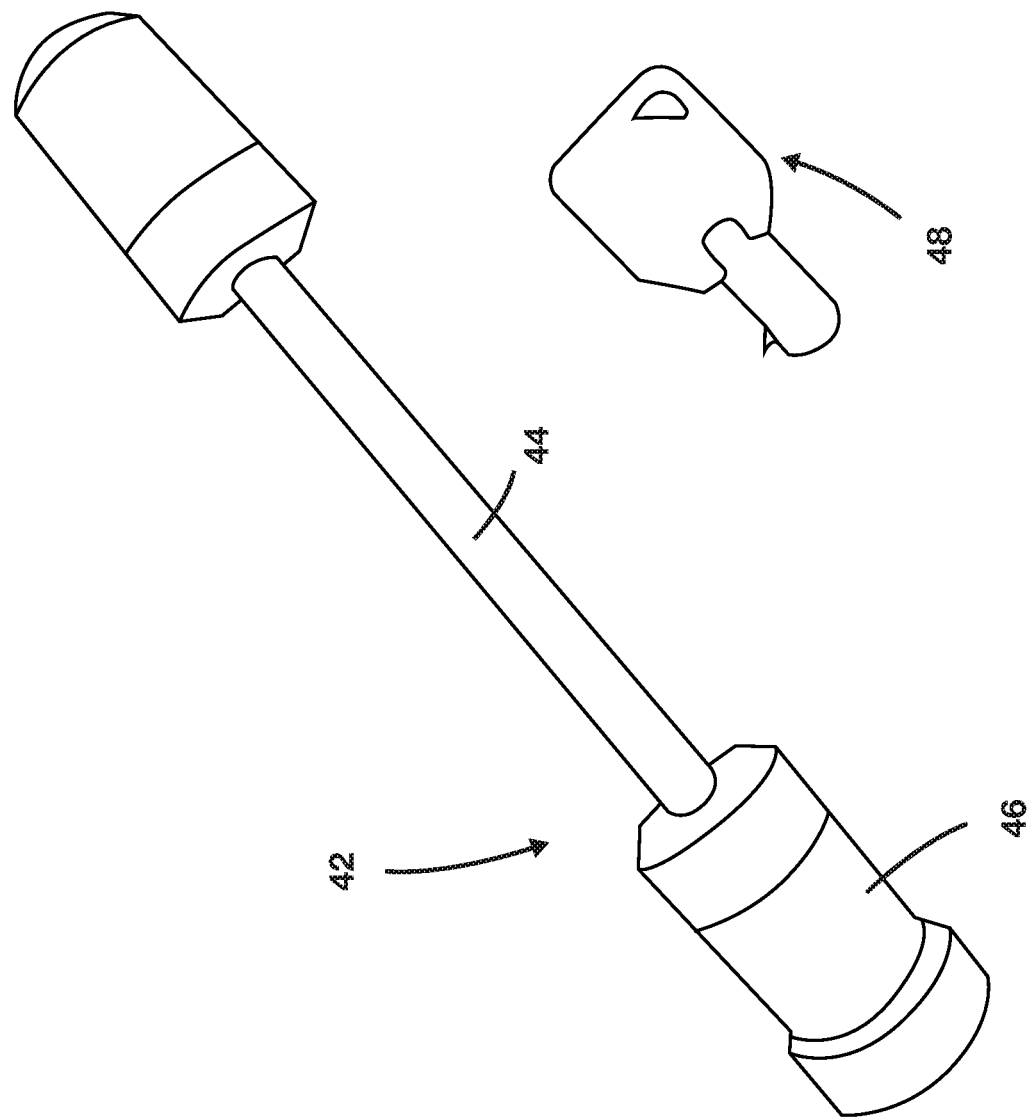
FIG. 2 is a perspective view of a prior lock device for a self-latching coupler.

To remove the coupler 20 from the hitch ball 50, a user rotates the release lever 26 to the open position (as shown in FIG. 1d), which draws the ball clamp 25 upward and away from the coupler socket 24. This increases the effective size of the coupler socket opening 23, allowing the coupler 20 to be lifted from the hitch ball 50, thereby removing the hitch ball 50 from coupler socket 24.

Having described the operational characteristics of a known self-latching ball and socket coupler, the features of a coupler lock device according to the present invention will now be described.

Figure 3:
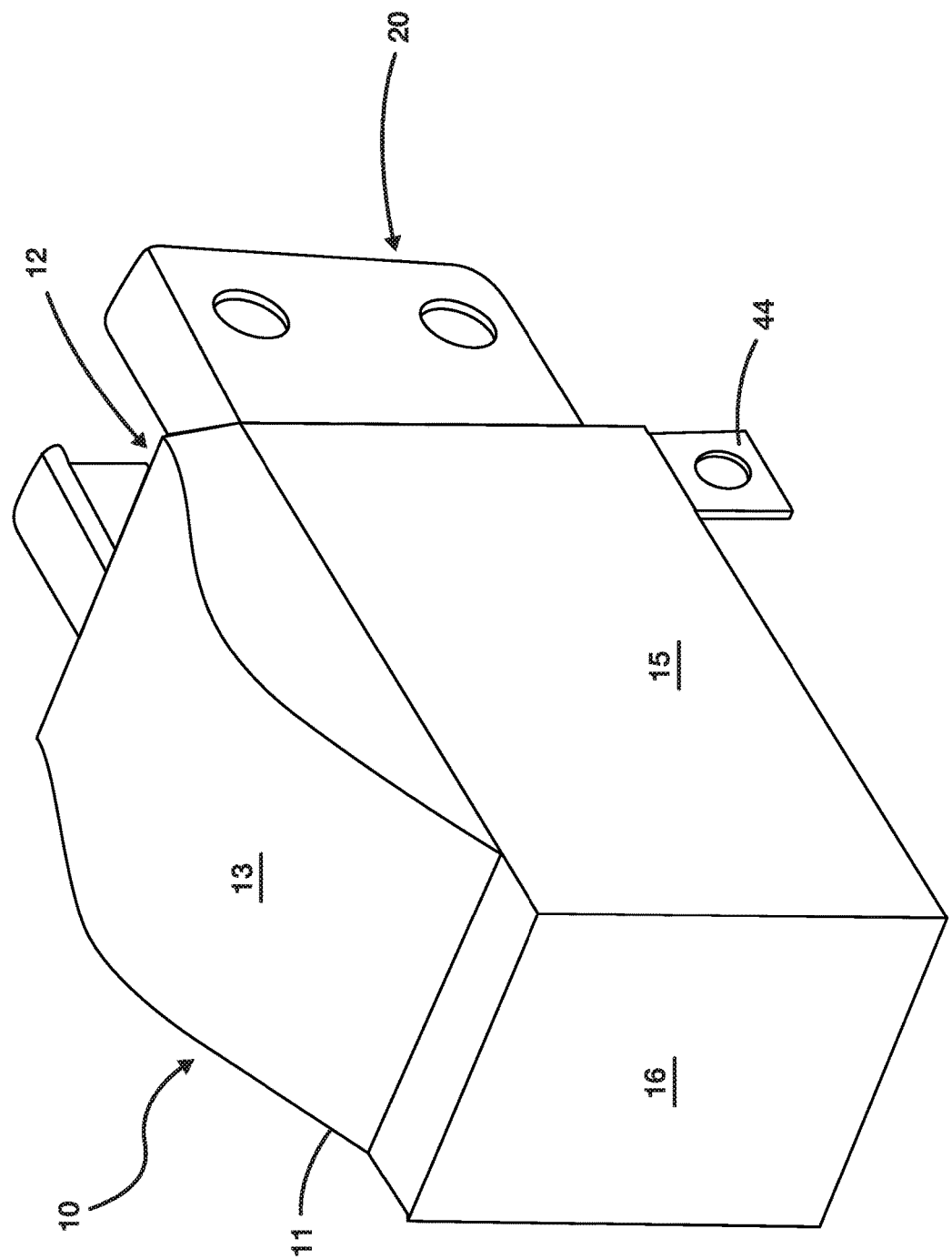
FIG. 3 is a top right perspective view of a trailer coupler of the type shown in FIGS. 1a-1d in combination with one embodiment of a coupler lock device according to the present invention, showing the coupler lock device positioned over the release lever with the closure member in the open position.
Figure 4:
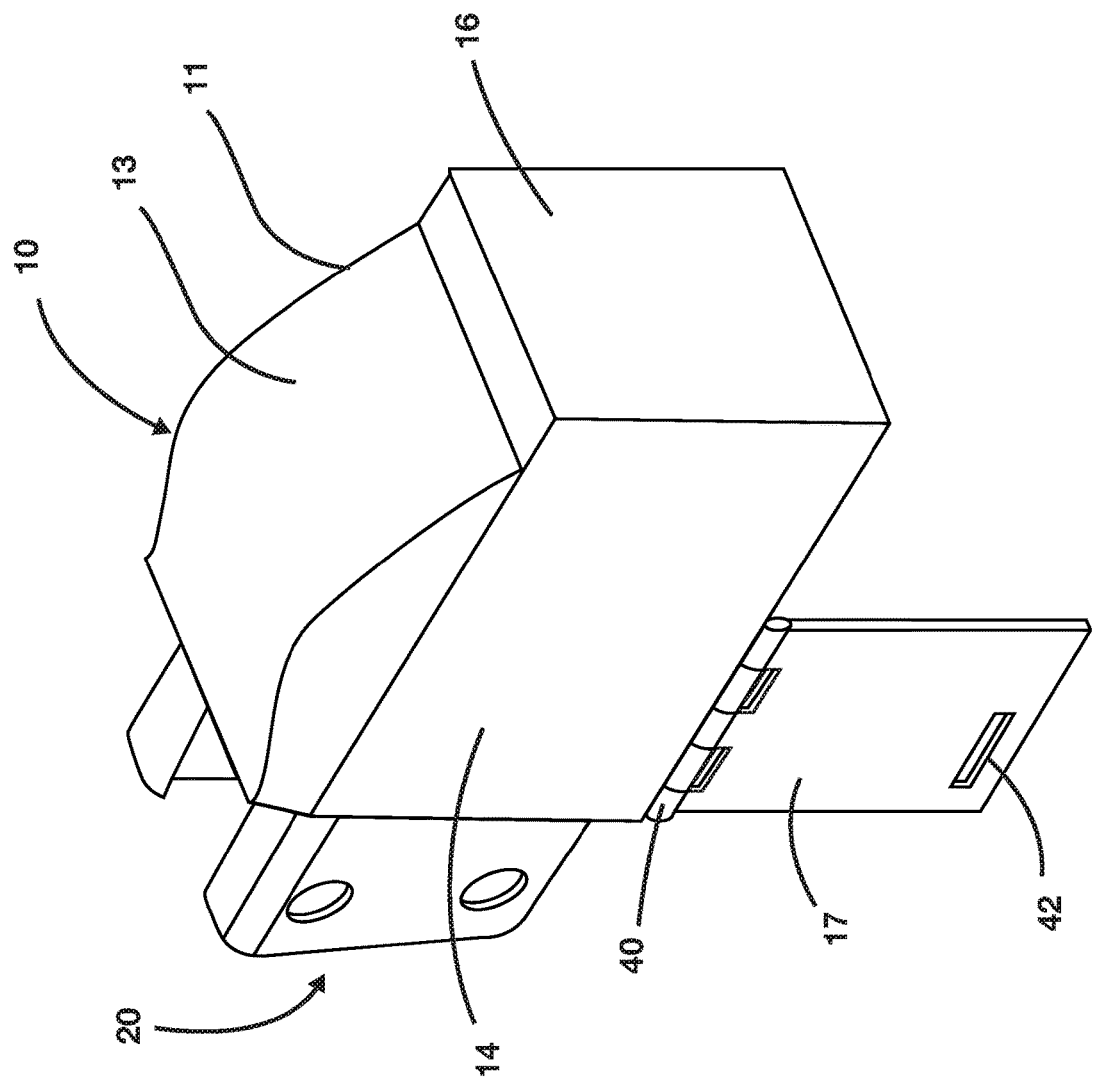
FIG. 4 is a top left perspective view of the trailer coupler and lock device combination of FIG. 3, showing the closure member in the open position.
Figure 5:
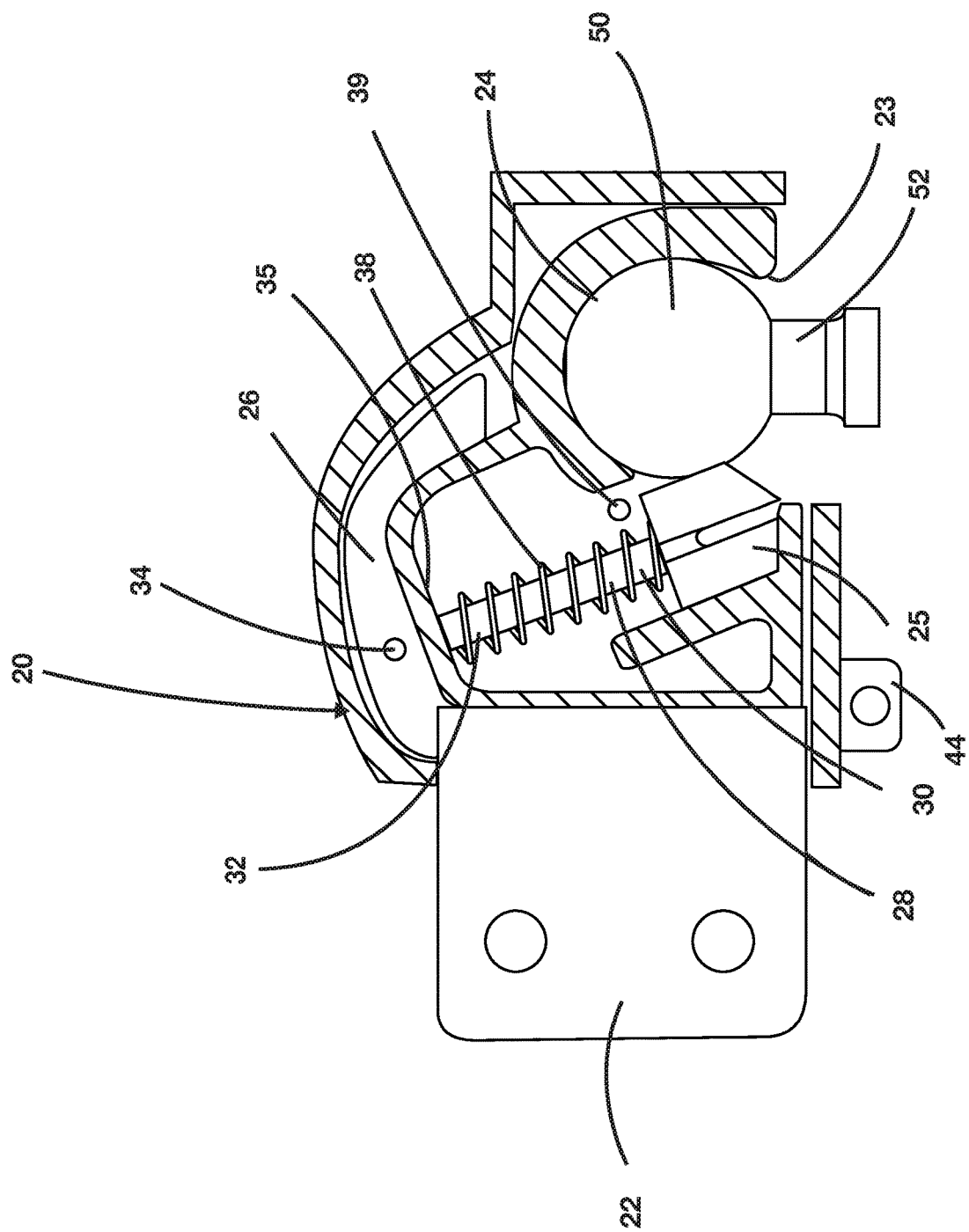
FIG. 5 is a cross-sectional side elevation view of the trailer coupler and lock device combination of FIGS. 3 and 4, showing the hitch ball secured within the coupler socket in the retention position of FIG. 1c with the release lever in the closed position and the closure member in the closed position.

FIGS. 3-5 illustrate one embodiment of a coupler lock device 10 according to the present invention shown in combination with a self-latching ball and socket coupler of the type shown in FIGS. 1a-1d. The lock device 10 includes a housing 11 which defines a rear opening 12 that receives the coupler 20 to allow for placement of the lock device 10 over the coupler 20. The housing 11 includes a top panel 13, side panels 14, 15, a front panel 16 and hinged closure panel 17. The top panel 13 and side panels 14, 15 define an enclosure 18 for closely receiving the release lever 26 when the lock device 10 is placed over the coupler 20 with the release lever 26 in the closed position. The release lever enclosure 18 is sized to prevent the release lever 26 (and thereby prevent the ball clamp assembly 21 and the ball clamp 25) from moving upward sufficiently to allow a hitch ball 50 to be inserted into or removed from the coupler socket 24, as discussed above. The closure panel 17 has a hinge 40 mounted to one side and a slot 42 in an opposing side. The hinge 40 is also mounted to one side panel 14 so that the closure panel 17 can be rotated between an open position (as can be seen in FIG. 4) and a closed position (as can be seen in FIG. 5). The other side panel 15 has a security padlock tab 44 that projects downward through the slot 42 when the closure panel 17 is in the closed position (as can be seen in FIG. 5).

A coupler lock device 10 according to the present invention can be used to deter unauthorized removal of a trailer or other towed vehicle from the towing vehicle. With the coupler release lever 26 in the closed position and the coupler 20 holding the hitch ball 50 in the retention position (i.e., with the trailer coupled to the towing vehicle) and with the lock device closure panel 17 in the open position, the lock device housing 11 can be positioned over the coupler 20 and release lever 26 (as can be seen in FIG. 4). After doing so, the closure panel 17 can then be moved to the closed position (as can be seen in FIG. 5), thereby enclosing the release lever 26 within the housing 11 (as can be seen in FIGS. 3-5). In this position, a security padlock (not shown) can be engaged with the padlock shackle through the padlock tab 44, to secure the lock device 10 over the trailer coupler 20. This prevents upward movement of the release lever 26 to the open position (which prevents removal of the coupler 20 from the hitch ball 50) and also prevents removal of the housing 11 from the coupler 20. To release the coupler from the hitch ball 50, a user can simply and conveniently remove the padlock, move the closure panel 17 to the open position as shown in FIG. 4, remove the coupler lock device 10 from the coupler 20, and lift the release lever 26 to the open position shown in FIG. 1*d*.

In addition, the coupler lock device 10 can deter theft of a trailer when it is not coupled to a towing vehicle by preventing unauthorized coupling of the trailer to a towing vehicle. By positioning the housing 11 over the release lever 26 of the uncoupled trailer and locking the closure panel 17 in the closed position, one can restrict the self-latching operation of the coupler 20 described above and thereby restrict an unauthorized person from seating the hitch ball 50 into the coupler socket 24 for towing.

Figure 6:
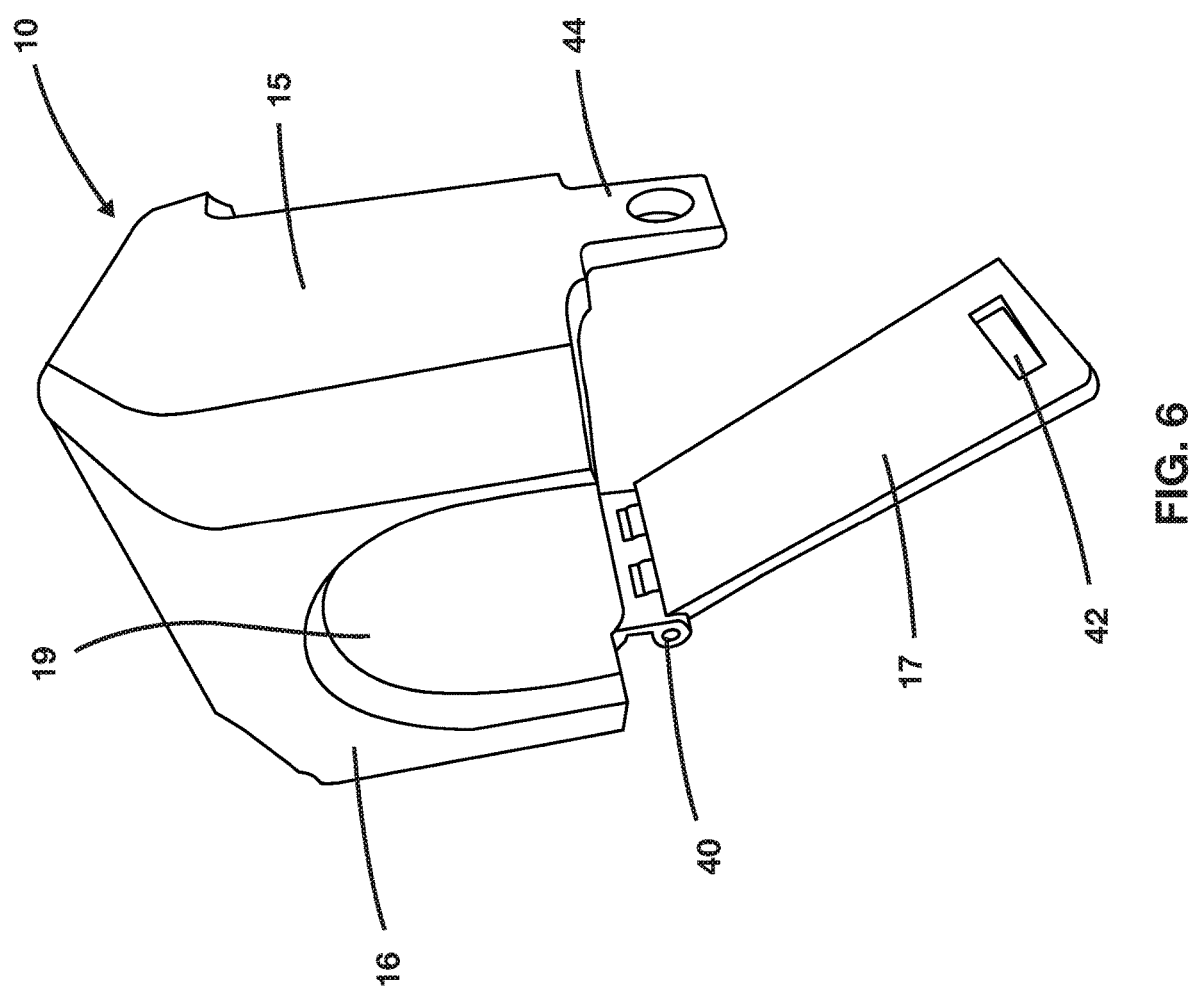
FIG. 6 is a front perspective view of another embodiment of a coupler lock device according to the present invention, showing the closure member in the open position.
Figure 7:
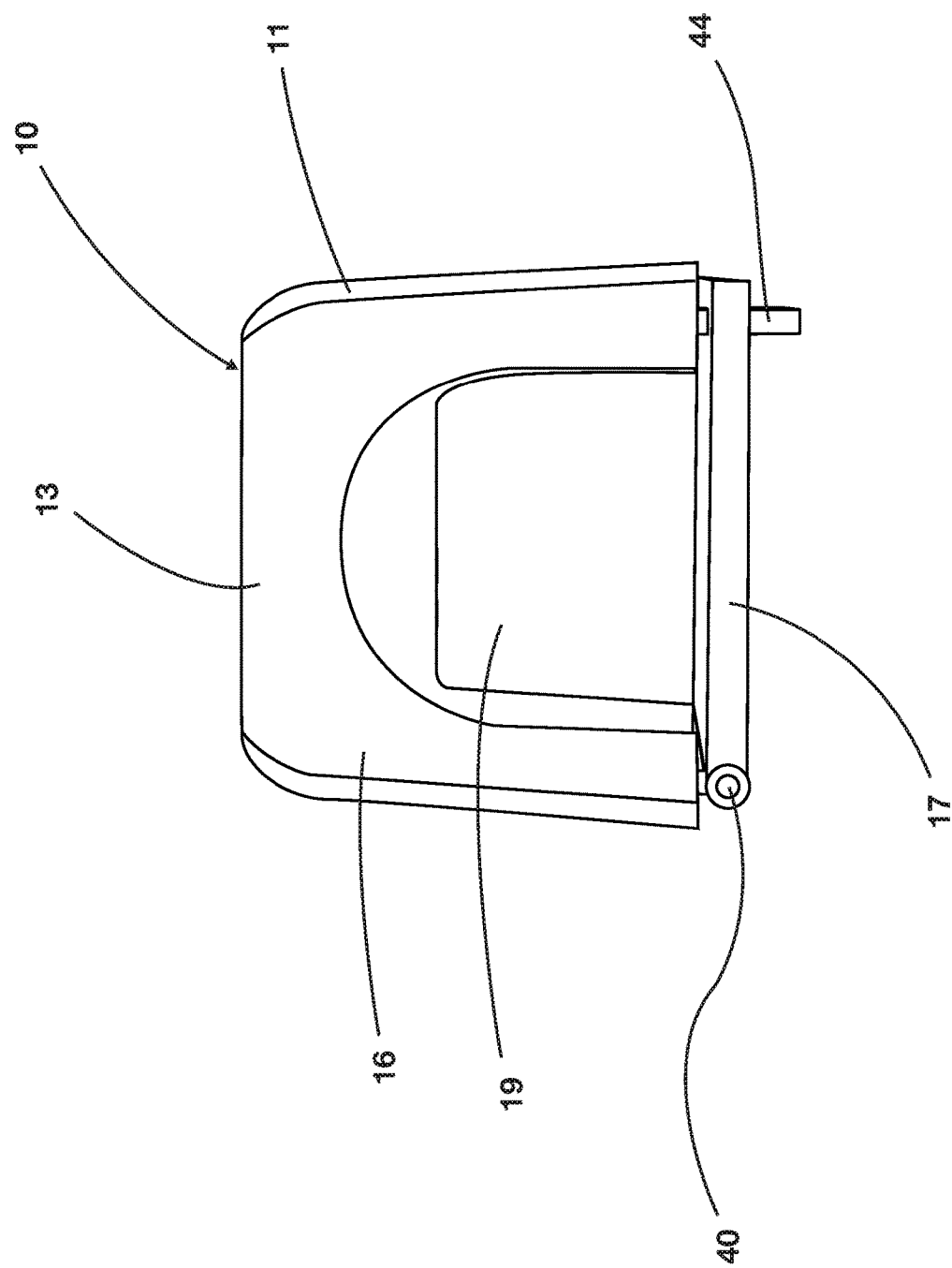
FIG. 7 is a front elevation view of the lock device of FIG. 6, showing the closure member in the closed position.
Figure 8:
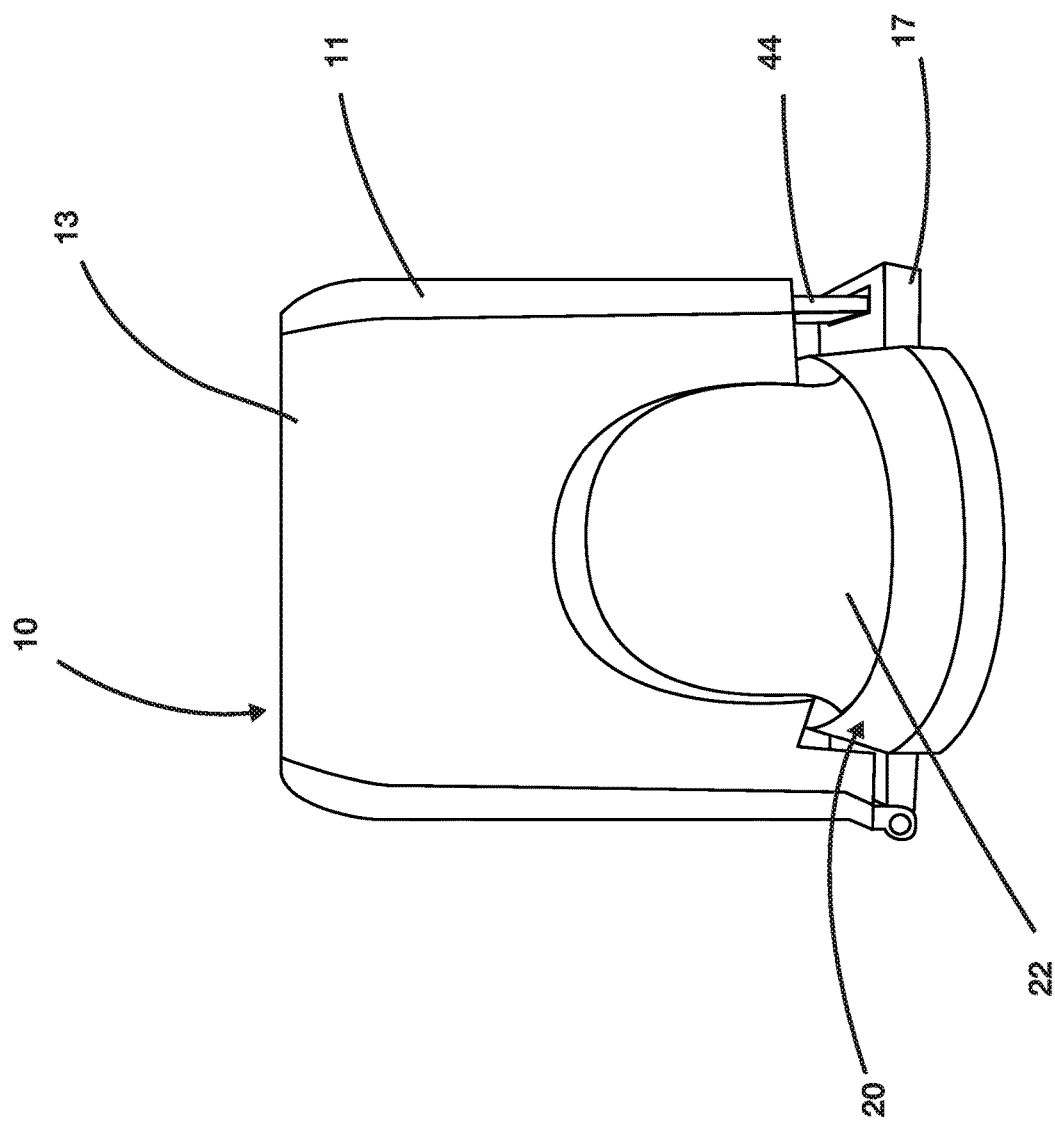
FIG. 8 is a front perspective view of the coupler lock device of FIG. 6 showing the coupler lock device positioned on the self-latching trailer coupler of FIGS. 1a-1d with the closure member in the closed position.

FIGS. 6-8 illustrate another embodiment of a coupler lock device 10 according to the present invention. This embodiment is similar to the embodiment of FIGS. 3-5, except in the embodiment of FIGS. 6-8, the front panel 16 has a front opening 19. As can be seen in FIG. 8, the side walls 14, 15 are not as long as those shown in the embodiment of FIGS. 3-5 and the front opening 19 is sized so that when the lock device 10 is placed on the coupler 20, the front portion of the coupler 20 protrudes forward out of the lock device 10. This configuration not only reduces the weight of the lock device housing 11, it maintains the does not extend forward of the coupler 20, this configuration maintains the greatest longitudinal clearance between the coupler and the ball mount and so that during a turn the coupler lock is less likely to contact a vertical portion of the ball mount and cause damage to either component.

From the foregoing, it can be seen that the apparatus of the present invention possesses several advantages. It provides a lock device that can be used with self-latching couplers that have a release lever for releasing the hitch ball from the coupler socket. The lock device is of relatively simple construction and is cost-effective to manufacture and maintain, and yet it still can effectively prevent theft of trailers.

Upon reading this disclosure, additional advantages and modifications will readily occur to those skilled in the art. Therefore, the invention in its broader aspects is not limited to the specific details, representative devices, and illustrative examples shown and described. Accordingly, departures may be made from such details without departing from the spirit or scope of the general inventive concept.

What is claimed is:

1. A coupler lock device for use with a self-latching trailer coupler, the coupler lock device comprises:
    a housing comprising:
        an opening configured to allow the housing to be secured on a self-latching trailer coupler;
        wherein the self-latching trailer coupler includes:
            a coupler socket adapted to receive a hitch ball, wherein the coupler socket includes a bottom socket opening that allows the insertion of the hitch ball into the coupler socket;
            a ball clamp assembly including a ball clamp disposed on a lower portion of a release lever shaft and a release lever coupled to an opposing upper portion of the release lever shaft, wherein the release lever is movable between a closed position and an open position;
            wherein the ball clamp assembly is configured so that: (i) when the release lever is in the closed position and as the hitch ball is inserted into the coupler, the ball clamp assembly moves upward to an intermediate position, and as the hitch ball becomes seated in the coupler socket the ball clamp assembly will automatically move downward to a latched position wherein the ball clamp retains the hitch ball within the coupler socket; and (ii) when the release lever is in the open position, the hitch ball can be removed from or inserted into the coupler socket;
        a housing top panel portion defining a cavity configured so that, when the housing is positioned over the trailer coupler, the housing top panel portion receives at least a portion of the release lever when it is in the closed position and prevents seating of the hitch ball in the coupler socket by restricting upward movement of the ball clamp assembly to the intermediate upper position when the hitch ball is inserted into the coupler; and
        a housing closure member movable between:
            an open position wherein the housing can be positioned over and removed from the trailer coupler; and
            a closed position wherein, when the housing is positioned over the trailer coupler, it can be secured to the trailer coupler to restrict removal of the housing from the trailer coupler when the hitch ball is affixed to a tow vehicle and is inserted into the coupler socket.

2. The coupler lock device of claim 1 wherein the closure member comprises a panel hingedly coupled to the housing.

3. The coupler lock device of claim 1 wherein the housing includes a closure tab and the closure member includes a slot configured to receive the closure tab when the closure member is in the closed position.

4. The coupler lock device of claim 3 wherein the closure tab includes a hole configured to receive a padlock shackle.

5. A coupler lock device for use with a self-latching trailer coupler, wherein the coupler lock device comprises:

a housing defining an enclosure for receiving at least a portion of a release lever positioned on top of a trailer coupler;
  wherein the trailer coupler is configured so that as it is lowered onto a hitch ball mounted to a tow vehicle, the release lever moves (i) from a lowered position to a raised intermediate position that permits the hitch ball to be inserted into the coupler socket, and (ii) then back to the lowered position that retains the hitch ball in the coupler socket, whereby the trailer coupler is coupled to the tow vehicle;
  wherein the trailer coupler release lever also is configured so that the retained hitch ball can be released by manually moving the release lever to a raised release position that releases the hitch ball from retention in the coupler socket; and
  wherein the housing comprises a top panel, two opposing side panels, an opening configured to allow the housing to be positioned over the release lever, and a closure panel movable between:
    an open position wherein the housing can be positioned over and removed from the trailer coupler; and
    a closed position wherein, when the housing is positioned over the trailer coupler, the closure panel restricts removal of the housing from the trailer coupler whether or not hitch ball is inserted into the coupler socket; and
  wherein the housing top panel portion defines an enclosure that is configured so that, when the housing is secured on the trailer coupler, the housing top panel portion (i) accommodates the release lever when it is in the lowered position, (ii) restricts movement of the release lever to the raised intermediate position, and (iii) restricts movement of the release lever to the release position.

6. The coupler lock device of claim 5 wherein the closure panel comprises a bottom panel hingedly coupled to the housing.

7. The coupler lock device of claim 5 wherein the housing includes a closure tab and the bottom panel includes a slot configured to receive the closure tab when the bottom panel is in the closed position.

8. The coupler lock device of claim 7 wherein the closure tab includes a hole configured for receiving a padlock shackle.

9. A coupler lock device comprising:
  a housing having an opening configured to receive a self-latching trailer coupler in an enclosed position wherein the housing covers at least a portion of a release lever that is movably mounted to the trailer coupler and is configured to secure a tow vehicle hitch ball within a coupler socket in a retention position for towing a trailer;
  wherein, as the coupler socket is lowered onto the tow vehicle hitch ball, the release lever moves between (i) a closed position that can retain the ball hitch within the socket of the trailer coupler (ii) a raised position that permits the insertion of the tow vehicle hitch ball into the coupler socket; and
  wherein the housing has a top panel portion defining an enclosure that is configured so that, when the housing is secured on the trailer coupler, the housing top panel portion accommodates the release lever when it is in the closed position and restricts movement of the release lever to the raised position.

10. The coupler lock device of claim 9 wherein the closure member comprises a panel hingedly coupled to the housing.

11. The coupler lock device of claim 9 wherein the housing includes a closure tab and the closure member includes a slot configured to receive the closure tab when the closure member is in the locked position.

12. The coupler lock device of claim 11 wherein the closure tab includes a hole configured to receive a padlock shackle.

\* \* \* \* \*